Jan. 21, 1930.   R. A. SHETZLINE   1,744,058

ELECTRICAL PROTECTIVE SYSTEM

Filed Oct. 27, 1928

INVENTOR
R. A. Shetzline
BY
ATTORNEY

Patented Jan. 21, 1930

1,744,058

UNITED STATES PATENT OFFICE

ROY A. SHETZLINE, OF NEW YORK, N. Y., ASSIGNOR TO AMERICAN TELEPHONE AND TELEGRAPH COMPANY, A CORPORATION OF NEW YORK

ELECTRICAL PROTECTIVE SYSTEM

Application filed October 27, 1928. Serial No. 315,473.

This invention relates to electrical protective devices, and particularly to devices characterized by means to restore them to their normal non-operated condition after they have operated.

A protective device having an air gap which breaks down at a predetermined potential, has long been used in the telephone art for the protection of circuits from high voltages set up therein by sources extraneous to the circuits themselves. One of the difficulties experienced with a protector of this type arises from its occasional failure to restore itself to its normal non-operated condition after it has operated to provide a low resistance path to ground for the current set up by the interfering voltage. This failure of the protector to restore itself to its normal non-operated condition results in increased maintenance costs upon the circuit and also increases the length of time during which the circuit may be out of use. It has been found that failure of a protector to automatically restore itself occurs principally when the protector is required to drain an abnormally large current for a relatively long time. The continued flow of large currents causes a burning or fusing of the electrodes of the air gap, which effectively bridges the gap.

It is the object of this invention to provide a system for the protection of circuits against high voltages, which is characterized by the ability of the protective devices to automatically restore themselves to their normal non-operated condition after an electrical discharge has taken place through them.

This is a continuation in part of the applicant's co-pending application, Serial No. 758,782, filed December 29, 1924, patent 1,715,475, June 4, 1929, and is intended to cover that form of the invention wherein the power system which induces the disturbing voltage in the communication circuits serves also as the pilot circuit, whereby the relay operates on excessive power currents or voltages rather than upon induced voltages.

Figure 1:
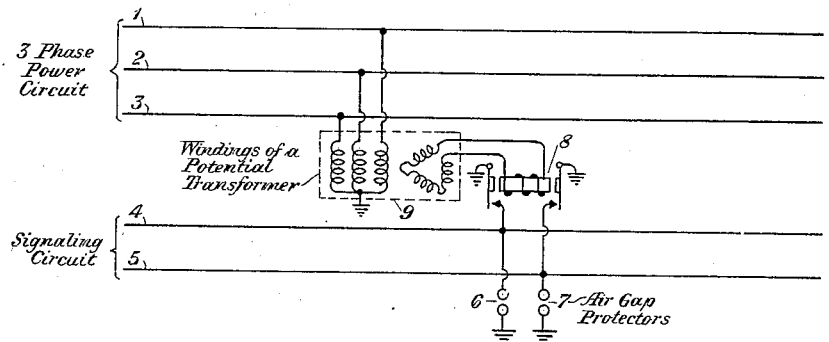
Figure 2:
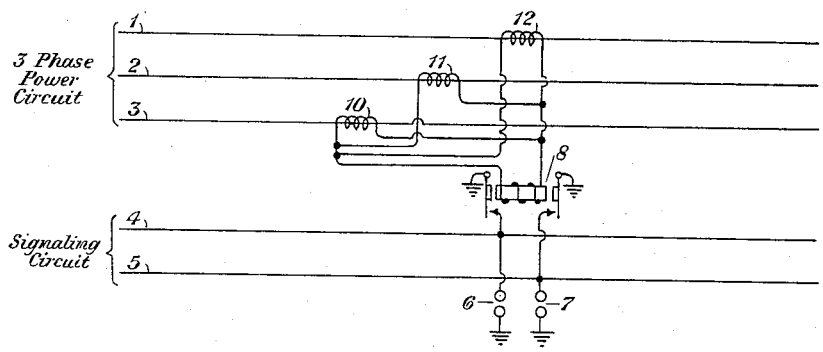

This invention will be thoroughly understood from the following description, when read in connection with the attached drawing of which Figure 1 shows a form of the invention in which the protective relay is operated by excess voltages in a three-phase power system; Fig. 2 shows a form of the invention in which the said relay operates upon excess currents in a three-phase power system; and Figs. 3 and 4 which are fragmentary show the application to a single phase system of the same principles illustrated in Figs. 1 and 2, as applied to a three-phase power system.

Figure 3:
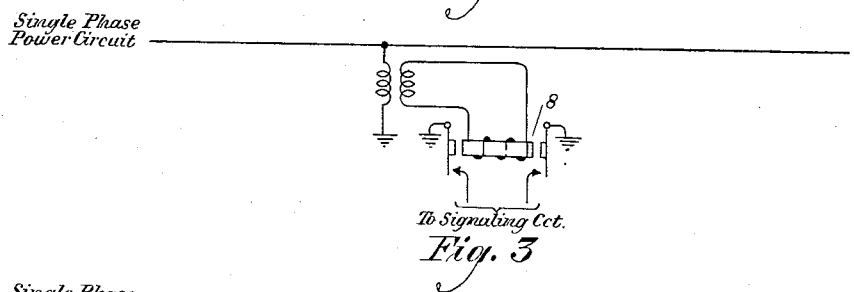

In Fig. 1, 1, 2 and 3 represent the conductors of a three-phase power circuit and 4 and 5 the conductors of a signaling or communication circuit that is exposed to inductive disturbances from the said power circuit. Connected with the conductors 4 and 5 are the air gap protective devices 6 and 7 which may be of any well known type used for the protection of communication circuits. The conductors 4 and 5 are also connected with the contact points of the relay 8 which is controlled by the power circuit. The devices 6 and 7 would normally be connected with the conductors to be protected at substantially the same point at which those conductors are connected with the contact points of the relay 8. The windings within the dotted rectangle designated 9 constitute a potential transformer comprising three primary and three secondary windings. Each primary winding is individual to and connected with one of the conductors of the three-phase power circuit. The secondary windings are connected with the winding of relay 8. The armatures of the relay are connected to ground and serve to ground the conductors 4 and 5 whenever the said relay operates. The manner in which the aforedescribed system functions is as follows:

Whenever the voltage induced in the signaling circuit between each wire thereof and ground exceeds a predetermined limit, the protective devices 6 and 7 will operate. When the excessive voltage was induced in the signaling circuit so as to cause the operation of its air gap protectors, an increased current would flow to ground through the primary windings of the transformer 9 thereby increasing the current flowing through the winding of relay 8 so as to cause its operation. The time required to operate a relay of the type to which relay 8 belongs is very brief, namely, of the order of 1/100 of a second. It will therefore be seen that the relay 8 will establish a path to ground in parallel with the paths through the air gap protectors 6 and 7 within 1/100 of a second after those protectors have operated. It will be seen that as soon as relay 8 operates, the conductors are directly grounded through the contacts of the relay which diverts the flow of the current from the protectors since the path to ground through the armatures of the relay is of much lower resistance than the path through the protectors.

The arrangement shown in Fig. 2 operates upon the same basic principle as the arrangement shown in Fig. 1, namely, the direct control of the relay by the power circuit itself. The arrangement in Fig. 2 differs from that in Fig. 1 only by virtue of the fact that the operation is based upon an excessive power current instead of an excessive voltage as in Fig. 1. In Fig. 2, the windings 10, 11 and 12 represent current transformers which are connected in parallel with the winding of relay 8. Since its mode of operation is the same as in Fig. 1, further description seems to be unnnecessary.

Figure 4:
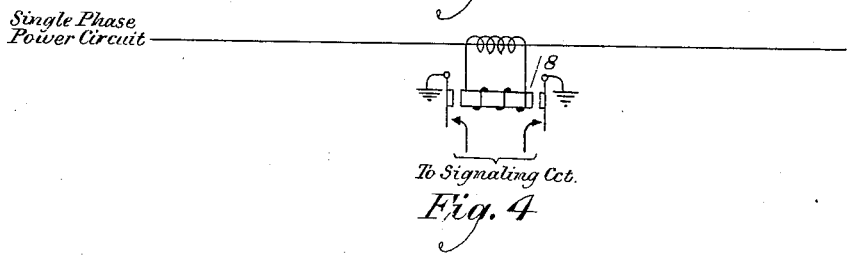

The arrangements shown in Figs. 3 and 4 are fragmentary in that the signaling circuit to be protected has been omitted and likewise the protective devices of that circuit and the connections with the contact points of the relay 8. Those features, however, would be identical with the corresponding parts shown in Figs. 1 or 2. The purpose of Figs. 3 and 4 is simply to show that the same basic ideas as disclosed in Figs. 1 and 2 in connection with three-phase power circuits may be employed upon a single phase circuit.

While this invention has been disclosed as embodied in particular forms, it is to be understood that it is capable of embodiment in other forms without departing from the spirit and scope of the appended claims.

What is claimed is:

1. In an electrical protective system, the combination with a circuit to be protected, of an air gap connected thereto to provide a path to ground for voltages exceeding a predetermined limit, a power circuit capable of having abnormal voltages set up therein and to set up abnormal voltages in said circuit to be protected, and a relay connected with said power circuit, adjusted to operate at a predetermined voltage thereon, said relay having means to provide drainage paths to ground in parallel with said gap.

2. In an electrical protective system, the combination with a circuit to be protected against voltages exceeding a predetermined limit, of an air gap protective device connected thereto to provide a path to ground for the voltages exceeding the said predetermined limit, a power circuit capable of having abnormal voltages set up therein and of creating abnormal voltages in the circuit to be protected, a transformer connected with the power circuit, a relay having its winding connected with the said transformer and having its armature and contacts so connected with the circuit to be protected and also with ground as to effectively ground the circuit to be protected whenever the relay operates.

3. In an electrical protective system, the combination with a circuit to be protected against voltages exceeding a predetermined limit, of an air gap protective device connected thereto to provide a path to ground for the voltages exceeding the said predetermined limit, a power circuit capable of having abnormal voltages set up therein and of creating abnormal voltages in the circuit to be protected and means controlled by said power circuit and operated whenever the voltage therein exceeds the predetermined limit to establish a path to ground from the circuit to be protected and in parallel with the path through the said protective device.

4. In an electrical protective system, the combination with a circuit to be protected against voltages exceeding a predetermined limit, of an air gap protective device connected thereto to provide a path to ground for the voltages exceeding the said predetermined limit, a power circuit capable of having abnormal voltages set up therein and of creating abnormal voltages in the circuit to be protected and means controlled by the said power circuit and operable within a definite interval of time after the abnormal voltage created in the circuit to be protected has caused the operation of the air gap protective device connected therewith to establish a path to ground from the circuit to be protected and in parallel with the path through the protective device.

In testimony whereof, I have signed my name to this specification this 25th day of October, 1928.

ROY A. SHETZLINE.